United States Patent [19]

Robinson et al.

[11] 3,951,362
[45] Apr. 20, 1976

[54] CRYOGENIC TANK AND AIRCRAFT STRUCTURAL INTERFACE

[75] Inventors: Robert K. Robinson, Mercer Island; Philip C. Whitener, Seattle, both of Wash.

[73] Assignee: The Boeing Company, Seattle, Wash.

[22] Filed: May 13, 1974

[21] Appl. No.: 469,583

[52] U.S. Cl. .................. 244/118 R; 114/74 A; 220/9 LG; 244/135 R
[51] Int. Cl.² .................. B64D 9/00; B64D 37/06
[58] Field of Search ............ 244/118 R, 135 R, 120; 114/74 A; 280/5 G; 220/9 LG, 3, 22; 62/45; 206/6

[56] References Cited
UNITED STATES PATENTS

| | | | |
|---|---|---|---|
| 2,379,126 | 6/1945 | Welden | 220/22 |
| 2,504,422 | 4/1950 | Johnson et al. | 244/120 X |
| 3,078,004 | 2/1963 | Randolph | 280/5 G X |
| 3,107,498 | 10/1963 | Messer | 220/9 LG X |
| 3,110,318 | 11/1963 | Eulitz | 244/135 R X |
| 3,157,147 | 11/1964 | Ludwig | 114/74 A |
| 3,321,159 | 5/1967 | Jackson | 244/135 R |
| 3,502,239 | 3/1970 | Worboys et al. | 114/74 A X |
| 3,659,817 | 5/1972 | Hendal et al. | 114/74 A X |

Primary Examiner—Trygve M. Blix
Assistant Examiner—Barry L. Kelmachter
Attorney, Agent, or Firm—H. Gus Hartmann; Glenn Orlob

[57] ABSTRACT

A cryogenic fuel tank of a cylindrical design having toroidal surface ends, is suspended in aircraft structure through a central front mount member; and the rear of the tank is supported by rod elements which extend: from a mounting ring about the tank, to mount points rearwardly within the interior of the fuselage. The central front mount member has a baffles attached thereto, so as to prevent undue sloshing of the liquid within the tank. The front end of the tank suspension absorbs radial and axial loads, but no bending moments; and the aft linkage suspension arrangement takes primarily radial and torsional loads. Also the aft suspension provides for unrestrained axial and radial contraction and expansion of the outer shell of the tank.

11 Claims, 8 Drawing Figures

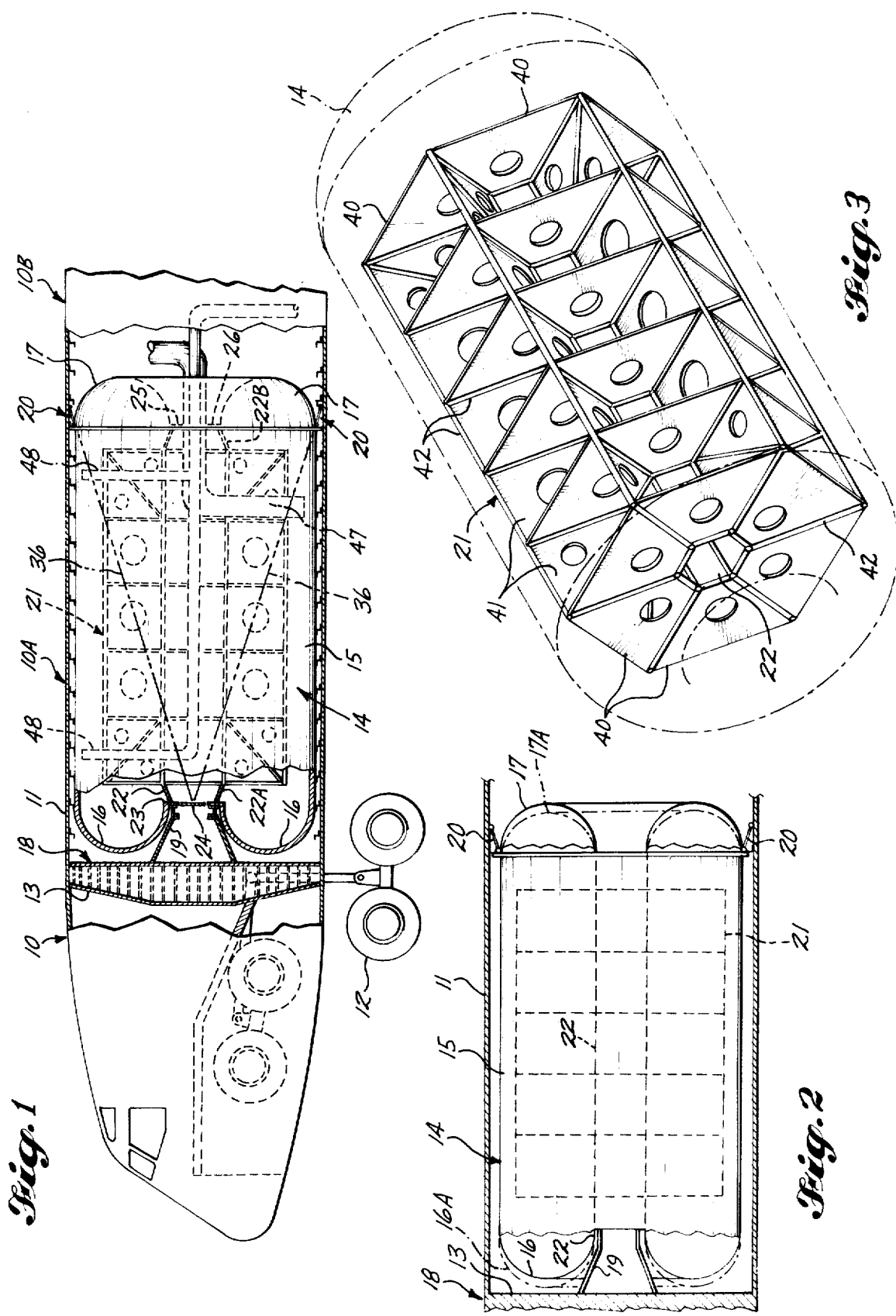

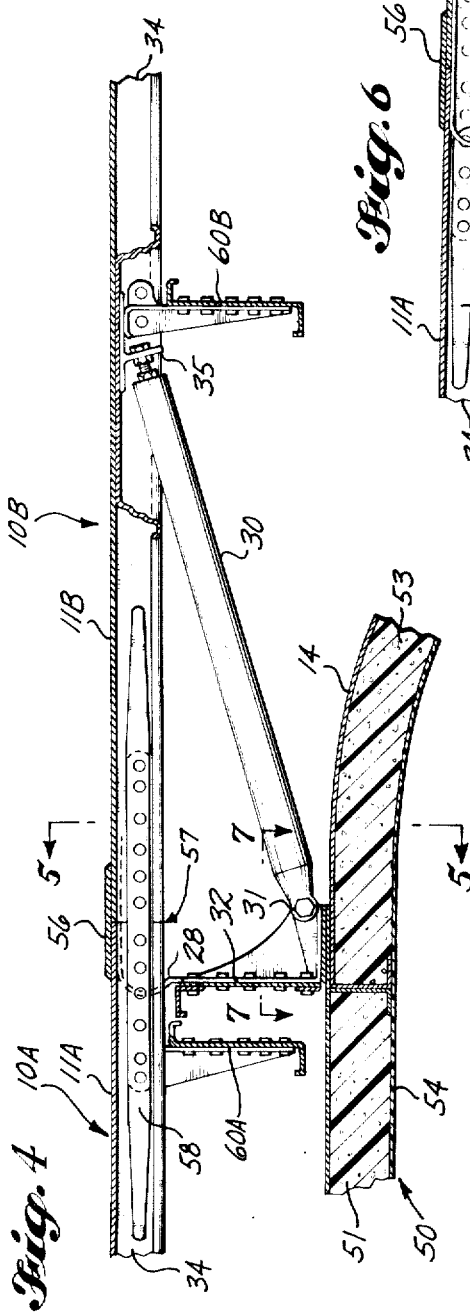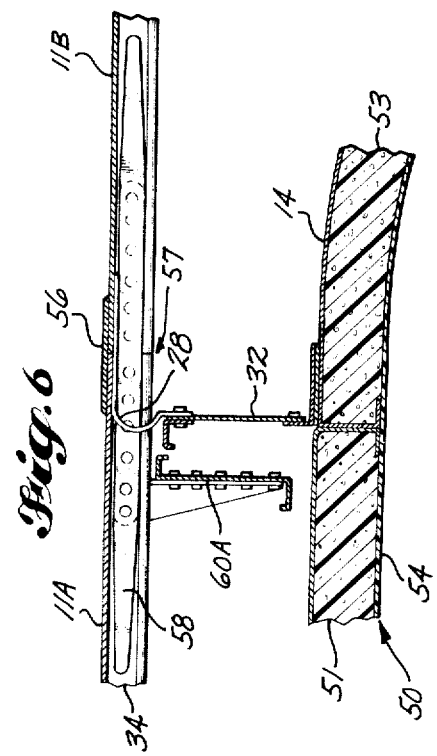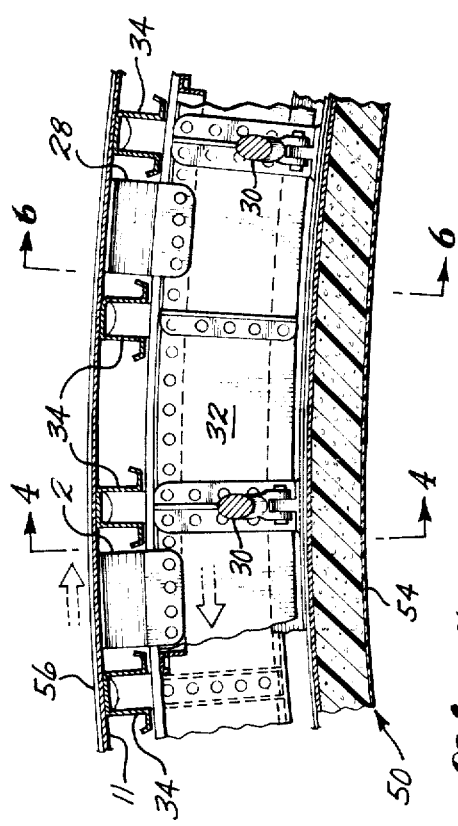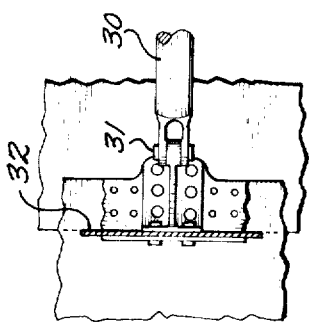

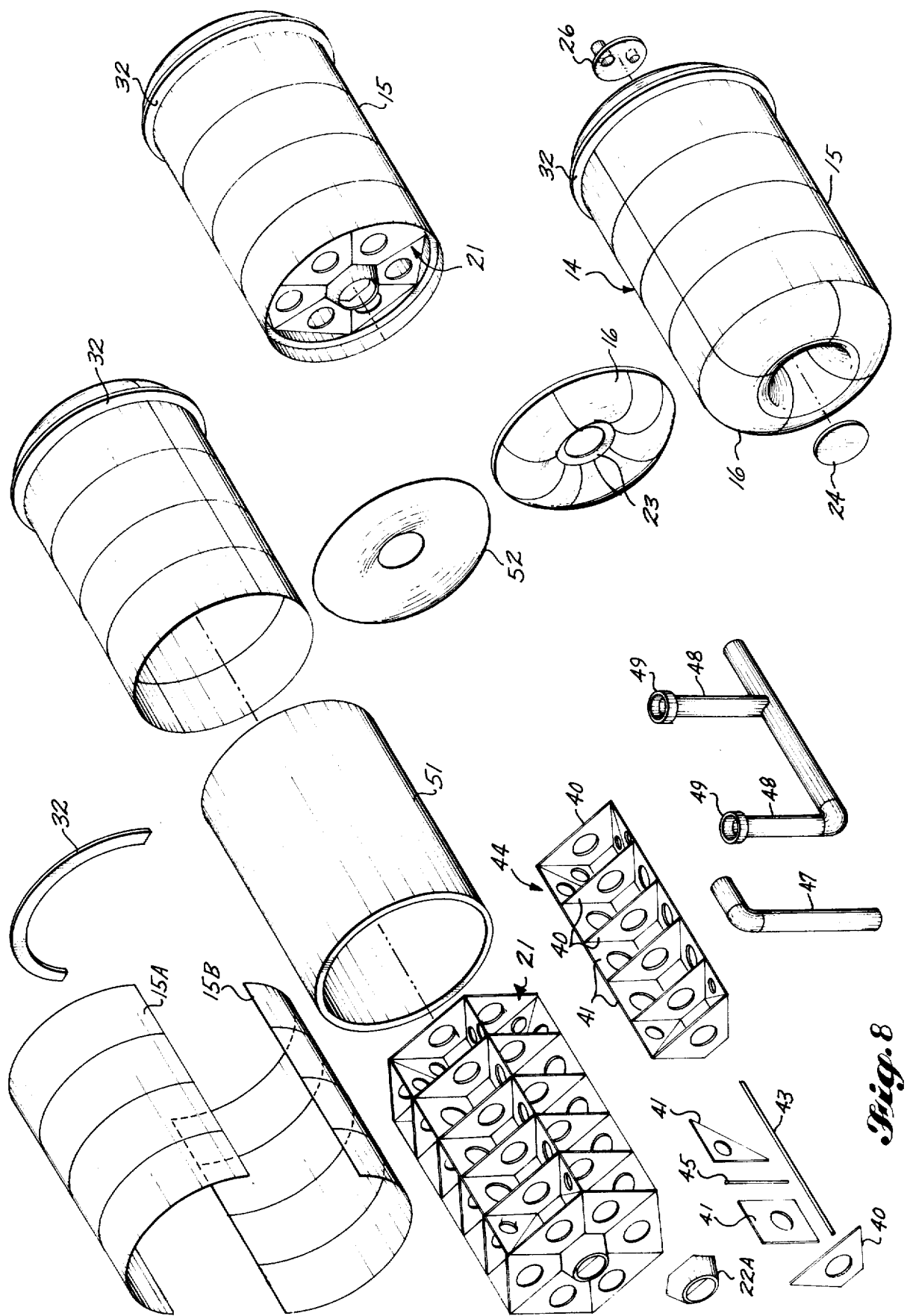

CRYOGENIC TANK AND AIRCRAFT STRUCTURAL INTERFACE

SUMMARY OF THE INVENTION

The invention relates to a cryogenic liquid container design comprising: a cylindrical mid-section, with torroidal shaped end bulkheads; and its structural mounting within the fuselage of an airplane, wherein the tank is supported from the center of one bulkhead and from the circumference of the other. More particularly, the invention relates to a liquefied natural gas cargo tank that is carried within the fuselage of an aircraft; and to the interface features between the interior and exterior of the tank, and elements of the fuselage.

In adapting any large aircraft, e.g., Boeing 747, Lockheed L1011, or the McDonnell Douglas DC-10, to handle cryogenic liquids such as liquid hydrogen or liquid natural gas at −258°F to −280°F, it is desirous to retain the existing fuselage size and not make it any larger; and still make the tank size as large as possible within the fuselage. Also, the tank should preferably not be made integral with the outer skin of the aircraft's fuselage, because it is difficult to insulate around the frames and stringers, and still have integrity in the insulation. The tank may not be full at all times; therefore, baffles and support structure will have to be provided for taking up the slosh loads. Since it is difficult to support baffles inside the fuselage of a conventional aircraft, having skin and stringer type construction, without penetrating the insulation in a lot of places, the baffle assembly is constructed to be supported entirely from its core or from the central section at its ends. The ends of the tank are of torroidal design in order to allow for thermal and pressure expansion and contraction; and the baffle system is supported entirely from the inside of the torroidal ends so that the outer shell of the tank structure is not penetrated. The tank is designed so as to have enough strength to support its own weight, so that the forebody of the fuselage can be made removable; and it is also designed to be supported in a cantilever manner from its aft end so that it can be sized to just barely fit inside the frames of the fuselage; and if necessary for inspection and maintenance purposes, the forebody can be removed.

One of the problems of transporting cryogenic liquids is in the manner of supporting the baffle structure within the shell of the tank, wihtout penetrating the insulation and getting insulation failures; and because the baffle structure of this invention is of a beam type construction and self supporting within itself so that it doesn't sag when simply supported at each end, it allows for complete integrity of the insulation within the tank shell without any concern for breaks or discontinuities.

There is little known in the prior art on handling cryogenics in airplanes and in putting or containing cryogenics inside the fuselage of an airplane. To the inventors' knowledge, there have been no known attempts to design an aircraft with a cryogenic payload. Some attempts have been made in the form of studies to provide for storage of cryogenic liquids in aircraft, either as fuel or for other reasons. Two such studies are documented in the following: NASA TND-4295, "Structural Feasibility Study of Pressurized Tanks for Liquid Methane Fueled Supersonic Aircraft;" and NASA TND-4837 "Comparative Study of Fuselage Tanks for Liquid Methane Fueled Supersonic Aircraft." These studies were not oriented toward producibility or serviceability, and no attempts toward fabrication are known.

One of the objects of the present invention is to provide a method for containerizing cryogenic fuels, such as methane $CH_4$, liquid hydrogen $LH_2$, etc.

Another object is to provide a containment for cryogenic liquids and the structural support therefore, that is compatible with the structural integrity and durability of the airframe structure in an airplane.

Another object is to provide for uniform insulation of the liquid payload at cryogenic temperatures, without any discontinuity or penetration of either the shell of the tank or the skin of the aircraft, by structure or plumbing except at the center of the torroidal end bulkheads of the tank.

One of the advantages of the present invention is that it provides flexible capabilities in tanks designed to carry cryogenic liquids, in order to accommodate the differential thermal expansion and contraction properties of the tank elements and their interface with airplane structure.

Another advantage is that the method for containerizing cryogenic fuels, as disclosed in this invention, is equally applicable to an integral fuel tank system for a cryogenic fueled aircraft; wherein, a fuel such as liquid hydrogen $LH_2$ is utilized; since the problems of thermal expansion, insulation and fire protection are similar to those of the present invention relating to a liquefied gas such as methane $CH_4$.

Another advantage is that with the cantilever suspension of the tank from aircraft structure being accomplished at the aft end, it permits separation of the aircraft fuselage surrounding the tank for inspection, maintenance and replacement of the tank.

Another advantage is that the tank construction permits the installation of a uniform thermal insulation barrier around the liquid, without any discontinuities or penetrations by support structure or plumbing, except at the center of the torroidal ends. This eliminates thermal shorts, sealing complications, and structural strain and fatigue problems. Also, the fabrication of both the tank and the insulation is simplified.

Another advantage is that the tank design concept of the invention could apply equally as well to the use of materials other than aluminum e.g., steel, titanium, or even filament winding of glass or composites such as graphite epoxy. Also, the method of fastening need not necessarily be that of a riveted construction, since mechanical fasteners, welding, brazine or bonding could be utilized.

These, as well as other objects and advantages of the invention, will be more clearly understood from the following description when read with reference to the accompanying drawings.

BRIEF DESCCRIPTION OF THE DRAWINGS

FIG. 1 is a side view of the forward body portion of the fuselage of an airplane showing the cryogenic liquid tank housed therein;

FIG. 2 is an enlarged cross-sectional view of the tank and shows how the toroidal ends of the tank deflect to accommodate the contraction and expansion of the baffle assembly with changes in temperature and internal pressure; and to accommodate the differential linear expansion of the tank and the ariplane shell;

FIG. 3 is an enlarged perspective view of the baffle assembly, interior of the tank;

FIG. 4 is a longitudinal cross-sectional view of the fuselage in enlarged detail, showing the aft support means between the tank shell and the fuselage skin and longerons, and is taken along the lines 4—4 of FIG. 5;

FIG. 5 is a transverse cross-sectional view of the fuselage in enlarged detial, showing the aft support structure for the tank; and is taken along lines 5—5 of FIG. 4;

FIG. 6 is a view similar to FIG. 4 and is taken along the lines 6—6 of FIG. 5; and is a detail of the curved shear tie member which is designed to carry only shear in the direction of the arrow depicted in FIG. 5.

FIG. 7 is a plan view of the strut connection to the tank, taken along the lines 7—7 of FIG. 4;

FIG. 8 is an exploded view in perspective of the components making up the tank.

DESCRIPTION OF THE PREFERRED EMBODIMENTS

FIG. 1 shows the forward portion of the fuselage 10 of an airplane, having a nose wheel landing gear 12 pivotally connected to fuselage structure such as a landing gear bulkhead 13. Housed within the fuselage 10 is a tank shell 14 having a cylindrical center section 15 and a forward and an aft end tank bulkhead 16 and 17 respectively, which are shaped to form torroidal surfaces. The forward support mounting structure assembly 18 for the front end of the tank shell 14 comprises in combination, the landing gear bulkhead 13 and a conically shaped aft projecting member 19. This forward support mounting assembly 18 is connected to the tank shell 14 through the center of the forward torroidal end bulkhead 16, in order to allow the torroidal surface to work in relieving the expansion and contraction forces on the tank. The aft end of the tank is supported through attachment fittings 20, which are shown and described in greater detail infra with respect to FIGS. 4 to 7, around the outside periphery of the tank shell 14 to the structural skin 11 of the fuselage 10.

The engine forward thrust and acceleration forces, and the engine reverse thrust, braking and deceleration forces, which are imposed on the cryogenic liquid in the tank shell 14 are transferred to the slosh baffle assembly structure 21 within the tank shell 16. All of these fore and aft slosh loads taken up by the baffle assembly structure 21 enter into the airplane support structure 18 comprising the landing gear bulkhead 13 and the conical member 19, at the front and through the attachment of the core 22 of the baffle assembly structure 21 directly to a ring member 23, that is integral with the center structure of the forward torroidal end member 16; and to which also the manhole cover or end cover plate 24 is fastened. Also, the baffle assembly structure 21 is fastened at its aft end through its core 22 directly to an aft ring member 25 that is integral with the aft torroidal end member 17 and positioned centrally thereof; and to which also a manhole cover or end cover plate 26 is fastened. Inertia loads on the baffles, due to the sloshing of the payload in a partially filled tank, are carried directly through the forward center tank support structure into the landing gear bulkhead 13 of the aircraft. Although this forward attachment fitting may appear to bear the entire weight of the tank with respect to fuselage structure, resulting in a large moment on the forward end, this is not the case because the aft end of the tank is supported in vertical shear by its outside attachment fittings 20 so that the forward end center fitting on the tank only takes up half of the tank weight. The center of the torroidal end members 16 and 17 is rigid with respect to the relatively flexible outer surface of the torroid; because shear loads applied at the center of the torroid are carried by the peripheral side surfaces of the torroid. So, there is no problem about vertical rigidity of the center of the torroid with respect to the outside of the torroid; and the vertical shear loads on the baffle assemblu structure 21 are adequately supported by the center of the torroidal end structure.

For a tank diameter of approximately two-hundred inches, the inquired tank gage thickness in the case of aluminum, is only one-tneth of an inch. This results in a very light weight tank that is particularly advantageous for missiles and airplanes, where every pound of wieght is important. Due to its light weight construction, the tank is very difficult to support unless it is done in a certain manner. Therefore, the method of support is of particular importance.

All of the shear loads i.e., the vertical, the horizontal side loads, and the torsional moments acting on the baffle structure, enter into the center of the torroidal end members 16 and 17 and are taken out equally between the forward center support structure assembly 18 and the aft outer peripheral attachment fittings 20.

FIGS. 4 to 7 show in greater detail these aft attachment fittings 20 which comprise a family of shear ties 28 and struts 30, that go all the way around the entire outer periphery of the tank shell 14 and carry the tank loads and moments from the aft-half of the tank and distribute them to the fuselage body skin structure 11 comprising the forebody and aft body skins 11A and 11B. The vertical component of the loads and the torsional moments of the tank shell 14 are transmitted to the fuselage skin structure 11 through a shear tie bracket 28 that interconnects a ring frame member 32 or flange of the tank shell 14, with the skin structure 11 of the fuselage 10. The shear tie bracket 28 is a curved member, which is designed to carry only shear loads in the direction of the arrows shown in FIG. 5, and not to carry loads in a direction perpendicular to the direction indicated by the arrows. The function of the curvature in the bracket 28 is so that it will be flexible in the driection perpendicular to the arrow direction, so that if the circumference of the tank shell 14 or its dimensions change with respect to the fuselage skin 11, that the tank changes and fuselage changes will not be reflected in loads in the shear tie brackets 28. Since they go all the way around the tank shell 16, the weight of the tank is carried in shear out to the skin 11 of the airplane. With the aircraft sitting on the ground, the vertical downward vector of the tank weight is reacted by or taken out in shear by those tie brackets 28 which are on the sides of the tank; and those brackets 28 above and below the tank, would not carry any loads, but merely flex. The tie brackets 28, which are above and below the tank, would function to take out the horizontal shear or side loads of the tank. Therefore the shear tie brackets 28 will take out any combination of horizontal or vertical shear loads, and also those due to torsion.

The fore and aft component of the tank loads gets into the longitudinal stringers 34 of the fuselage, through a circumferential series of struts 30, positioned around the inner periphery of the fuselage 10; and from there, the load enters the body shell or skin structure 11 of the fuselage 10. Each of the strut members 30, at its forward end, is connected at 31 to the ring frame member 32 of the tank shell 14 and at its other end it is connected at 37 on the center line of the longitudinal stringer 34. A strut mounting bracket 35 is attached to the longitudinal stringers 34, all the way around the fuselage 10. The longitudinal axis of the struts 30 are aligned as shown in FIG. 1 by the forward converging dash-dot-dot lines 36 from the struts 30 to the conical forward support 19, to intersect approximately in the plen of plane cover plate 24; and in this way, all the vertical shear loads will be carried by the shear ties 28 and the struts 30 need only carry the fore and aft loads of the tank shell 14, which in turn are introduced right into each longitudinal stringer 34 of the fuselage 10.

FIG. 2 shows the torroidal surfaces 16 and 17 work to relieving the expansion and contraction forces on the tank shell 14. The cylindrical side portion 15 of the tank shell 14 is not in direct contact with the shell of the fuselage 10, so that the sides of the tank can expand and contract without interference. The tank shell 14 is supported at its aft end by the outer structural skin 11 of the fuselage, through an interconnection 20 which is shown in greater detail in FIGS. 4 to 7 as comprising shear tie brackets 28 and struts 30. The flange 32 around the outer periphery of the tank shell 14, has a fixed relationship with respect to its adjacent attachment to the body shell of the fuselage 10. Therefore, when the cylindrical sides of the tank shell 14 contract in legnth as well as diametrically, with the aft end 17 of the tank shell 14 being relatively fixed to fuselage strcuture 11 through its attachment fittings 20, it pulls the top of the forward torroidal end 16 aft and causes it to get smaller in diameter, as shown by the change in outline 16A to 16. Also, if the body shell of the fuselage 10 should lengthen due to thermal changes, the forward support structure for the tank shell 14 including its attachment to the baffle core structure 22 through conical support member 22, will move correspondingly and the forward torroidal end 16 will permit relative motion between the body shell of the fuselage 11 and the tank shell 14. Even though the torroidal ends 16 and 17 are substantially at the same temperature as the cylindrical side center section 15, and of the same material for changing in diameter right along with the cylinder portion, a change in length of the cylindrical side center portion 15 of the tank shell 16 is still taken up by the deflection in the torroid end members 16 and 17. Should the baffle core structure 22 shrink due to low temperatures inside the tank, the aft torroidal end 17 would deflect to correspond to the change in length of the baffle core structure 22 as shown by the change in outline from 17 to 17A, without introducing any strains into the mount system at either end i.e., either the aft attachment fittings 20 or the forward support assembly structure 18. In general, the thermal and pressure induced expansion and contraction characteristics of both the fuslage 10 and the tank shell 16 including its baffle assembly 21, causes the torroidal ends 16 and 17 to deflect in such a manner that the skin surface of the torroidal ends, rolls around like a diaphragm or bellows.

With respect to the means for attaching the aft end of the tank to fuselage support structure: where there is inadequate structural support within the fuselage at the desired attachment location for the aft end of the tank, such as a major support bulkhead like a landing gear bulkhead 13, the support loads for the aft end of the tank will have to be transferred to the aircraft's outer skin structure 11. Therefore, as shown, the aft end of the tank is attached through a connecting means 20 on the outside of the tank, to the outside skin structure 11 of the fuselage 10 to provide a good structural load path into the airframe.

The torroidal end members 16 and 17 can not be fastened to the airframe around the outside of the tank at both ends; unless, provision is made for some expansion and contraction of the tank and its contents. Alternatively, all of the outside supports at the aft end of the tank could be removed and replaced by a support to the center of the torroid, as shown in the forward end, and then supported on a post that would be attached to floor structure of the aircraft as long as no attempt is made to take the thrust loads out at both ends. Since the front end of the tank is attached to fixed structure, the aft end attachment to the post would have to be through a device that would allow longitudinal expansion and contraction movement of the tank.

The baffle length, i.e., the distance between the fore and aft torroidal centers, which are fastened to the baffle core structure 22, changes due to temperature and pressure fluctuations. The internal pressure fluctuations of the tank, are taken up by the flexible torroid end members 16, 17; and the loads are transmitted to the centers of the torroid end members, where they enter the framework core 22 of the baffle assembly structure 21. The internal tank pressure fluctuations tend to vary the distance between the fore and aft torroidal centers and the baffle core structure 22 interconnecting the fore and aft torroidal centers fuctions to restrain that. The tank will not function properly as a pressure vessel unless there is a tie between the centers of the two torroidal ends. Otherwise, the centers of the torroids would just pop out. Therefore, the baffle structure functions as a tension and compression tie for the variable internal pressure loads on the tank.

As shown in FIG. 8, the tank itself, as far as the shell and its method of construction are concerned, is standard and can be welded or riveted for low cost fabrication and service. For minimum weight, and material compatibility with aircraft structure and the cryogenic liquid contents, the outer skin of the tank is made of aluminum. The tank is symetrical about its longitudinal center line and the fore and aft torroids 16, 17 are similar. The construction of the tank is such that it is capable of taking loads applied to the centers of the torroids; and it can be completely supported at the centers of the torroids, if some provisions are made for the pressure and thermal induced expansion and contraction of the tank, through whatever means are used for mounting or attaching it to aircraft structure.

As shown in FIGS. 3 and 8, the baffle assembly 21 is made up of radial panel segments 40 or panels arranged in a radial plane for fore-and-aft slosh control; and longitudinal panel segments 41 or panels arranged in longitudinal planes for side slosh control. The tank loads that are due primarily to acceleration and deceleration forces, will be taken up by the internal slosh baffle structure and put into the forward support structure. The baffle structure is of a space frame type of construction and can be made very light. The framework 42 for the baffle structure is made from longitudinal length members 43 and radial length members 45 of H-section extrusions. The baffle framework 42 of H-section extrusions can be considered as comprising a series of longitudinal beams that are arranged radially i.e., wherein each longitudinal bearm comprises those radial segments of the frame network, that are aligned in a longitudinal plane with the longitudinal baffle panels 41 inserted therebetween, to provide the material for the shear forces; and wherein each of the longitudinal beams are rigidly interconnected along their inner radial edge to form the core structure 22 of the baffle framework. As shown in FIG. 8, the framework structure is initially made in longitudinal sections 44; and then three of these longitudinal sections 44 are arranged symetrically about a longitudinal axis to form the hexagonal cross-section framework 42. Since the frame network 42 is a truss structure which is rigid longitudinally with the longitudinal baffle members 41 providing the shear material, it is fairly easy to support it from the center at each end. Also, since the cross-sectional shape is hexagonal, the honeycomb panel, forming the baffles, are simple to make. Each of the panels is of light weight construction such as honeycomb core material and the baffles, having straight sides, can easily be cut out from honeycomb sheet stock. Each of the baffle panels has a hold through it so that the slosh energy of the fluid can be dissipated. The honeycomb panels are then slid into the slots of the H-section extrusions making up the frame network 42 and are thereby retained from falling out.

The baffle assembly structure 21 has a central opening there through, or a hollow care 22, so that access to the interior of the tank can be had through an opening in the forward end, by removing the manhole cover plate 24 at the plain of symmetry of the torroidal end. The forward manhole cover plate 24 is in sealing engagement with a ring member 23 that is integral with the center of the forward torroidal end member 16; and the ring 23 is also rigidly connected to the forward conical core and member 22A of the baffle assembly 21. The size of the opening and that of the hollow core, for a tank diameter of approximately seventeen feet, is such that a person can get inside of the tank for maintenance and inspection. The core of the baffle structure is of open framework construction and is not that of a solid cylindrical core structure. The baffle structure is strong engough to enough inspection and maintenance personnel; and because it is of open framework construction, they can crawl all around between the baffle panels and through the slosh openings in the baffles. The baffle structure also supports all of the plumbing lines, valves, and gages required for the cryogenic liquid system.

The plumbing system for the tank can be seen in FIGS. 1 and 8. All of the plumbing lines enter the tank through the center of the aft torroidal bulkhead 17; and the vent lines 48 then bend up toward the top of the tank and the drain line 47 is bent down towards the bottom of the tank. A float valve 49 is mounted in the upper portion of the vent lines 48 to prevent the liquid from entering into the vent system. The tank is filled through the drain line 47. The plumbing lines on the inside of the tank are all supported by the baffle assembly structure 21, and are supported in such a manner, that although they are at approximately the same temperature as the baffle structure, they are subjected to thermal shocks and thermal gradients during filling and draining operations, and therefore require a certain degree of expansion flexibility in their connection to baffle structure. In order to allow the baffle structure to change in length with respect to the piping just outside of the tank, the plumbing lines have expansion joints (not shown) just outside of the end plates.

The seals (not shown) with respect to the plumbing lines entering the tank, are all within the aft end cover plate 26; which, in turn, is in sealed engagement with a ring 25 integral with the center of the aft torroidal end 17. The internal pipe lines do not touch the interior of the tank anywhere, so that there will not by any abrasion of the insulation assembly 50.

Insulation assembly 50 is installed on the inside of the tank structure, so that the basic external structure or shell of the tank 14 is not at the temperature of the cryogenic liquid. Although, the tank shell 14 is not at the temperature of the cryogenic liquid, it is never-theless at a different temperature than that of the airplane skin; and so, as more clearly shown by the dash-dot outline and the solid line in FIG. 2, the torroidal ends are used to allow for the contraction and expansion of the tank. In FIG. 8, the insulation assembly 50 comprises: approximately two inches thick of cast polyurethane foam, that is formed into a cylindrical sleeve center section 51 and molded torroidal end members 52 forward and 53 aft, these are cemented in place and installed under a residual compressive stress in order that the thermal shock gradient caused by filling the tank with liquefied gas at cryogenic temperatures and the sudden contraction of the thermal insulation, does not result in the insulation cracking; and on the inside of this is a liquid barrier liner 54 of two thin layers of mylar or polyurethane film of 0.01 inches thick each, for a total thickness of 0.02 inches of leakproof material. Other than the liquid barrier liner 54, the thick foam insulation which is bonded to the inside of the tank, is in contact with the cryogenic liquid. Therefore, if a liquid other than methane is used, then a different liner and foam insulation material will have to be used; i.e., one that will be compatible with the liquid e.g., if this type of a tank is used as the fuel tank for an aircraft, then in addition to selecting a liner and foam insulation material that is compatible with the fuel, it will be necessary to select a material that will not slough off and contaminate the fuel system. The double layer film 54 on the inside if the tank shell 14 seals in the cryogenic liquid, like liquid natural gas at −258°F, from the outer skin of the tank; however, the aluminum tank material itself is also sealed, so that in case of failure of the double layer film 54 and rupture of the foam insulation, the liquid or gaseous methane would still not leak out through the aluminum tank shell; i.e., at least for the limited period of time necessary to safely land the aircraft and remove the contents; since the sealant need not necessarily be impervious for an indefinite period. The temperature of the outer skin of the tank will be about −30°F at a cruise altitude of approximately 30,000 feet; and the fuselage skin temperature, due to skin friction will be about 40°F. So there will be approximately a 70°F temperature differential. Both the tank and the airframe are constructed from a material that doesn't get brittle at low temperatures, such as aluminum; and they are separated in order that there is no contact between them. The tank does not touch the shell of the fuselage except for its fore and aft mounting attachments. Therefore, no insulation is required between the outer skin of the tank and the basic fuselage structure for preventing fuselage distortion. This space is filled up with gaseous methane. When the cryogenic liquid, such as methane, boils off from the tank and before it is released overboard from the airplane, it is directed into the space between the tank and the fuselage so that moisture condensation will not form in there. The entire airplane is vented with gaseous methane and the tank is surrounded with methane gas at all times. Venting of the space between the fuel tank and the outside aircraft structure prevents the build-up of explosive mixtures. Also, inerting of this space is possible. Sould the tank rupture, the liquid methane could get onto airplane structure; however, due to the airplane being such a good heat sink, it functions just like a hot-plate sizzles the methane, i.e., the liquid methane just boils off and immediately evaporates. In the event of a local insulation failure within the tank or a rupture of the tank itself, the sudden lowering of the fuselage skin temperature adjacent to the rupture, would not likely have any detrimental effect on the structural integrity of the aircraft. The aluminum would get cold and may conceivably take a permanent set at the local place. But, since both the tank and the aircraft structure are of common material, i.e., aluminum; and aluminum will not get brittle at low temperatures, there would be no need for heating devices, such as encasing the tank in a heating blanket. Same ice would form on the outside of the fuselage where the rupture occurred. But, other than that, the structure would really not be affected. There may be some thermal stress in the fuselage structure which might cause the structure to shrink; and then when it warmed up again, cause it to buckle; i.e., the structure may not be as smooth as it was before, but is isn't going to fall apart.

A method for installing the cast polyurethane foam insulation is to mount it on an undersized mandrel and then evacuate, to suck the insulation down against the mandrel. Then the inside of the tank is sprayed with a bonding agent and the insulation on the mandrel is inserted into the tank and then the vacuum is released; thereby, installing the insulation, bonded to the inner surface of the tank with a residual compressive stress, to avoid cracking due to thermal shock, since cracks cannot develop in the absence of tensile stresses.

Since the tank could conceivably occupy a large volume in the interior of the aircraft, and be positioned so close to the interior skin of the airplane that there would be no way to have access to the space between the tank and the skin, all of the fluid and control lines of the aircraft systems, which are conventionally routed within the fuselage structure, would freeze in the event of a tank rupture. Therefore, all of the lines, i.e., hydraulic, electrical, and control lines and cables are run outside of the fuselage in race ways (not shown); which also makes the lines accessible without having to pull the nose of the aircraft off. The race ways would be such a small protuberance, in comparison to the size of the fuselage, that it would be hardly noticeable; and it would have little aerodynamic effect on the performance of the aircraft. Should the aircraft not be modified to eliminate the possible freezing and access problems associated with having the control system lines routed within the fuselage adjacent to the tank, the tank can be sized so as to allow sufficient space for access around it, and by supporting it at its center at both ends, it could be installed in an existing aircraft like the Boeing 747, Lockheed L-1011, or McDonnell Douglas DC-10 and thereby modify such aircraft to a tanker version. Inspection of the tank interior can be made by egress through the forward bulkhead 16 centerline hatch 24.

There is very little clearance between the inner circumference of the fuselage 10 and the outer circumference of the tank shell 16, so that inspection of the tank exterior can not be readily made with the forebody 10A in place. For separating the forebody 10A and aftbody 10B sections of the fuselage 10, the object is to leave the aft attachment fittings 20, comprising the struts 30 and the shear ties 28, connected to the aftbody section 10B; thereby, retaining the attachment of the aft end of the tank shell 16 thereto so that the tank remains supported in a cantilever fashion by its aft attachment fittings 20. The tank is designed structurally to have enough strength to support its own weight when supported from its aft end in cantilever fashion from the aftbody 10B section of the fuselage 10.

In FIGS. 4 to 7, the fuselage splice band 56 is riveted to and butt joins the outer structural skin of the fuselage at a circumferential break 57 that separates the forward section of the fuselage 10 or forebody 10A and the aft section of the fuselage or aftbody 10B. The forebody 10A and the aftbody 10B are separated as follows: attach a two wheeled dolly (not shown) to the fuselage 10 just forward of the circumferential break 57 at the aft end of the tank shell 16; disconnect all of the airplane systems lines crossing this section break 57; drill out the rivets in the forward portion of the splice band 56, which are fastened to the forebody 10A; remove the rivets or bolts in the forward portion of the longitudinal stringer splice straps 58, which also are fastened to the forebody 10A, to permit separation of the longitudinal stringers 34; remove the rivets in the forward portion of the shear ties 28, which also are fastened to the forebody 10A, but the rivets of the shear ties 28 which are in the aftbody 10B must be left in, in order to retain the support of the tank; the body frame member 60A remains attached to the forebody 10A; remove the fasteners attaching the conical forward tank support member 19 to the nose gear bulkhead 13; and attach a towbar (not shown) to the nose gear 12 and pull straight forward. This will leave the tank cantilevered from the aftbody 10B with the plumbing and seals undisturbed; but, the entire exterior of the tank will be accessible for inspection, as well as the interior of the removed forebody 10A. Removal of the tank from the afbody 10B can then be accomplished as follows: attach a handling dolly (not shown) to the tank shell 16; disconnect all of the plumbing lines from the aft end of the tank; remove the rivets in the aft portion of the splice band 56, which fasten the shear ties 28 to the aftbody 10B; remove the pins or bolts 31 connecting the forward end of the struts 30 to the aft tank support ring 32; and then tow away the tank on the dolly. The separation of the fuselage would not be necessary very often. perhaps just a couple of times during the life of the aircraft. In addition, this separation feature or capability, facilitates the assembling of the airplane since the entire tank, including all of the plumbing, could be installed, pressurized, and pressure tested without the forebody 10A being attached; and without any further disruption of the plumbing system, the two body sections can be connected together. When the uselage is separated, just a dummy jack (not shown) is required to support the forward portion of the aftbody 10B. For assembly, the tank is empty and the forebody 10A is slid onto and attached to the tank at the inside of the forward torroid 16; and then the outer structural skin 11 of the fuselage 10 and its stringers 34 are butt jointed at the fuselage break 57 and fastened together.

Normally, for filling or emptying of the tank shown in the preferred embodiment installation, it would not be removed from the fuselage of the aricraft. However, if the tank support structure were modified so that the tank could be supported from the inside of the torroid at both ends, in a manner similar to that of the front end support shown in FIG. 1, by some sort of an integral external frame structure that could easily be removed and replaced as a unit, then for quick turnaround as a cargo tanker aircraft, rather than taking the time to fill or empty the tanks, they could be exchanged as a unit.

Also, as a further embodiment, the light weight tank construction concept could be used in a truck tanker combination; wherein, the tank is supported centrally at its ends.

While the invention has been disclosed with reference to a preferred embodiment, it is to be understood that modifications and changes which become obvious to a person skilled in the art as a result of the teachings hereof, will be encompassed by the following claims:

What is claimed is:

1. A fluid container for an airplane, comprising: an elongated cylindrically shaped container for positioning longitudinally within the fuselage of the airplane; said container having a cylindrical center section and semi-toroidal-ring surface end members; a baffle assembly having a core support structure; said baffle assembly being mounted within the container in spaced relation to the interior wall surfaces of the container by said core structure interconnecting the semi-toroidal-ring surface end members through their centers to react the baffle assembly sloshing fluid pressure loads against the semi-toroidal-ring end members and to allow the surfaces of the semi-toroidal-ring end members to work in relieving expansion and contraction forces on the container without abrasion of the baffle assembly; a front and a rear mounting ring, each being integral with the central portion of a semi-toroidal-ring surface end member and fixedly secured to the end of the core structure of the baffle assembly for mounting the container to aircraft support structure in spaced relationship from the interior sides of the fuselage.

2. The fluid container for an airplane, as set forth in claim 1, including a thermal insulation layer fastened to the interior surface of the container and being under a residual compressive stress when the tank is empty, such that the thermal shock gradient caused by filling the tank with liquefied gas at cryogenic temperatures and the sudden contraction of the thermal insulation, does not result in the insulation cracking.

3. The fluid container for an airplane, as set forth in claim 1, including: plumbing lines entering into the interior of the container through a central opening in a semi-toroidal-ring surface end member; and said plumbing lines being supported within the container by said baffle assembly and its core structure, such that the outer shell of the container is not penetrated by said plumbing lines or support structure therefore.

4. The fluid container for an airplane, as set forth in claim 1, wherein the baffle assembly is of a framework type construction and said core structure is open; and including a hatch positioned centrally in a semi-toroidal-ring surface end member for permitting access into the interior of the container through said open core structure.

5. A fluid container for an airplane, comprising: an elongated cylindrically shaped container for positioning longitudinally within the fuselage of the airplane; said container having a cylindrical center section and semi-toroidal-ring surface end members; a baffle assembly having a core support structure; said baffle assembly being mounted within the container in spaced relation to the interior wall surfaces of the container by said core structure interconnecting the semi-toroidal-ring surface end members through their centers to react the baffle assembly sloshing fluid pressure loads against the semi-toroidal-ring end members and to allow the surfaces of the semi-toroidal-ring end members to work in relieving expansion and contraction forces in the container without abrasion of the baffle assembly; a forward mounting ring integral with the central portion of the forward semi-toroidal-ring surface end member and fixedly secured to the forward end of the core structure of the baffle assembly for mounting the forward end of the container to aircraft support structure in spaced relationship from the sides of the fuselage; and a rear mounting ring rigidly secured around the outer periphery of the container at the rear end of the cylindrical center section for mounting the rear end of the container through a circumferential series of attachment fittings to airplane fuselage structure in spaced relationship from the interior sides of the fuselage.

6. A liquefied gas transport airplane, comprising: an elongated cylindrically shaped container for the liquefied gas, extending longitudinally within the fuselage of the airplane; said container having a cylindrical center section and semi-toroidal-ring surface end member; a baffle assembly having a core support structure; said baffle assembly being mounted within the container in spaced relation to the interior wall surfaces of the container by said core structure interconnecting the semi-toroidal-ring surface end members through their centers to react the baffle assembly sloshing fluid pressure loads against the semi-toroidal-ring end members and to allow the surfaces of the semi-toroidal-ring end members to work in relieving expansion and contraction forces on the container without abrasion of the baffle assembly; a front and a rear support for the container, each being fixedly secured to airplane structure and fastened at opposite ends of the container to both the central portion of the semi-toroidal-ring surface member and to the end of the core structure of the baffle assembly for retaining the container in spaced relationship form the interior sides of the fuselage.

7. The liquefied gas transport airplane, as set forth in claim 6, including a thermal insulation layer fastened to the interior surface of the container and being under a residual compressive stress when the tank is empty, such that the thermal shock gradient caused by filling the tank with liquefied gas at cryogenic temperatures and the sudden contraction of the thermal insulation, does not result in the insulation cracking.

8. The liquefied gas transport airplane, as set forth in claim 6, including: plumbing lines entering into the interior of the container through a central opening in a semi-toroidal-ring surface end member; and said plumbing lines being supported within the container by said baffle assembly and its core structure, such that the outer shell of the container, is not penetrated by said plumbing lines or support structure therefore.

9. The liquefied gas transport airplane, as set forth in claim 6, wherein: the baffle assembly is of a framework type construction and said core structure is open; and including a hatch positioned centrally in a semi-toroidal-ring surface end member for permitting access into the interior of the container through said open core structure.

10. The liquefied gas transport airplane as set forth in claim 6, wherein the fuselage of the airplane comprises a circumferential structural skin break for bodily separating the fuselage upon disconnection of the container from one of said front and rear supports; and said container being supported from the other of said front and rear supports in a cantilever manner so as to expose the container for access and removal.

11. A liquefied gas transport airplane, comprising: an elongated cylindrically shaped container for the liquefied gas, extending longitudinally within the fuselage of the airplane; said container having a cylindrical center section and semi-toroidal-ring surface end members; a baffle assembly having a core support structure; said baffle assembly being mounted within the container in spaced relation to the interior wall surfaces of the container by said core structure interconnecting the semi-toroidal-ring surface end members through teir centers to react the baffle assembly sloshing fluid pressure loads and to allow the surfaces of the semi-toroidal-ring end members to work in relieving expansion and contraction forces on the container without abrasion of the baffle assembly; a forward support for the container fixedly secured to airplane structure and fastened to both the central portion of the forward semi-toroidal-ring surface member and to the forward end of the core structure of the baffle assembly; for retaining the forward end of the container in spaced relationship from the side of the fuselage; and a rear support for the container comprising a flange secured around the outer periphery of the container at the rear end of the cylindrical center section, and attachment fittings interconnecting the flange with fuselage structure for supporting the rear end of the container in spaced relationship from the interior side of the fuselage.

* * * * *